United States Patent [19]
Schmidt et al.

[11] Patent Number: 4,783,019
[45] Date of Patent: Nov. 8, 1988

[54] FILM SUPPLY MAGAZINE FOR FILM SHEET PACKS PROVIDED WITH LIGHT-SEALING SHEATHINGS

[75] Inventors: Manfred Schmidt, Kirchheim; Johann Zanner, Unterhaching, both of Fed. Rep. of Germany

[73] Assignee: AGFA-Gevaert AG, Leverkusen, Fed. Rep. of Germany

[21] Appl. No.: 7,360

[22] Filed: Jan. 27, 1987

[30] Foreign Application Priority Data

Feb. 14, 1986 [DE] Fed. Rep. of Germany ....... 8603910
May 13, 1986 [DE] Fed. Rep. of Germany ....... 3616069

[51] Int. Cl.$^4$ .................. G03B 42/04; B65H 75/28
[52] U.S. Cl. ............................. 242/74; 242/67.1 R; 206/455; 378/182
[58] Field of Search ............... 378/182, 188; 242/74, 242/71.1, 67.1 R, 195, 197; 206/455

[56] References Cited

U.S. PATENT DOCUMENTS

| | | | |
|---|---|---|---|
| 3,948,457 | 4/1976 | Spreitzer | 242/71.8 X |
| 4,248,172 | 2/1981 | Kröbel | 116/213 X |
| 4,444,484 | 4/1984 | Best | 378/182 X |
| 4,616,914 | 10/1986 | Buelens | 242/71.1 X |
| 4,663,528 | 5/1987 | Fujiwara | 378/182 X |

FOREIGN PATENT DOCUMENTS

| | | | |
|---|---|---|---|
| 239052 | 3/1965 | Austria | 242/74 |
| 0052159 | 5/1982 | European Pat. Off. | |
| 1952385 | 4/1971 | Fed. Rep. of Germany | 242/74 |
| 7725804 | 1/1978 | Fed. Rep. of Germany | |
| 3405423 | 5/1985 | Fed. Rep. of Germany | |
| 3122582 | 6/1985 | Fed. Rep. of Germany | |

*Primary Examiner*—Stuart S. Levy
*Assistant Examiner*—Katherine Matecki
*Attorney, Agent, or Firm*—Michael J. Striker

[57] ABSTRACT

A film supplying magazine which receives a pack of film sheets, covered with a light-tight sheathing and is insertable into a device which removes from said pack individual film sheets, comprises a box receiving a film pack, and a cover for closing the box. The sheathing has a winding flap while the magazine has an externally operated rotatable winding shaft to which the flap of the sheathing is connected so that the flap together with the sheathing is pulled off the pack and wound on the shaft when the latter is rotated. Velcro tapes are provided at the free end of the flap and at a portion of the winding shaft, which ensure an automatic connection between the flap and the shaft.

3 Claims, 5 Drawing Sheets

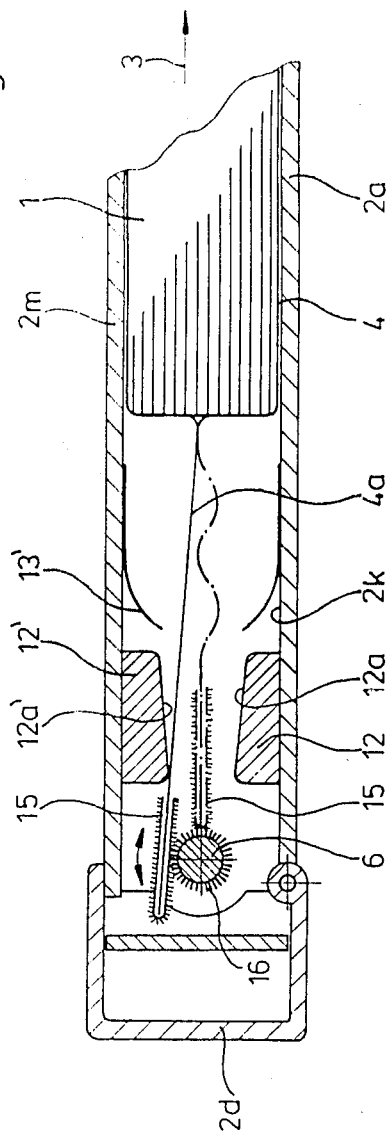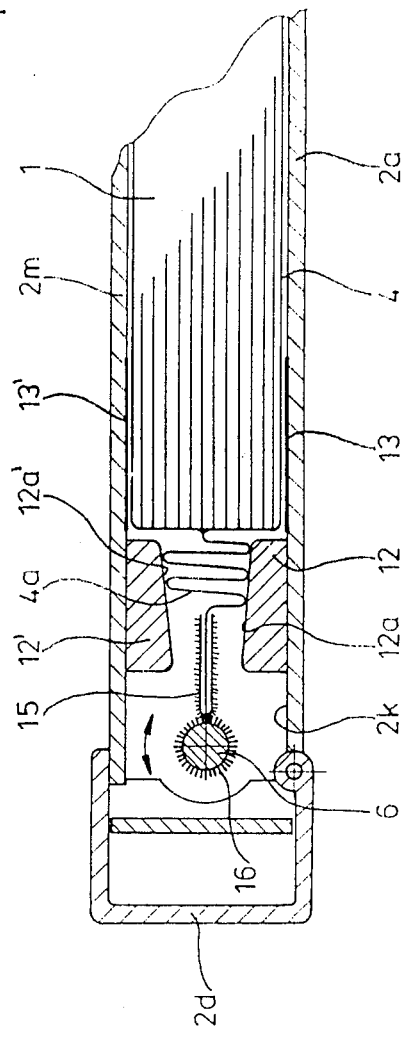

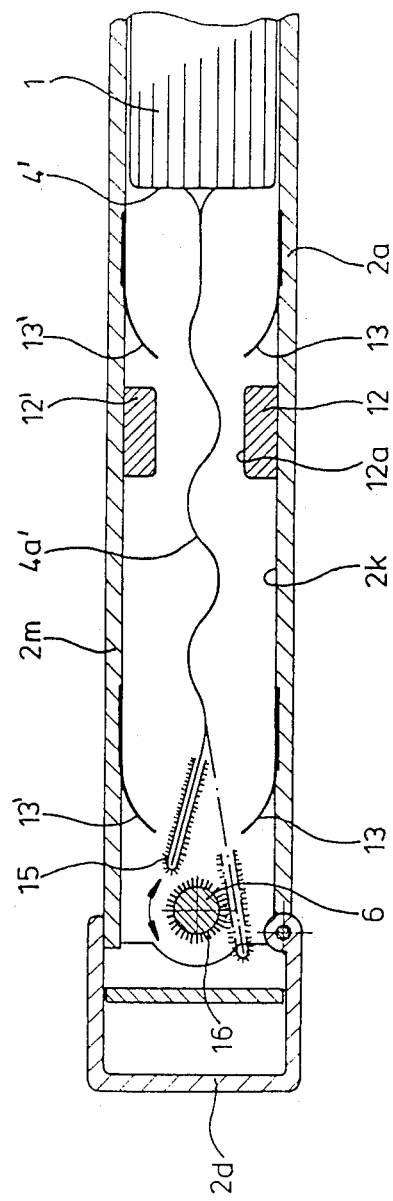
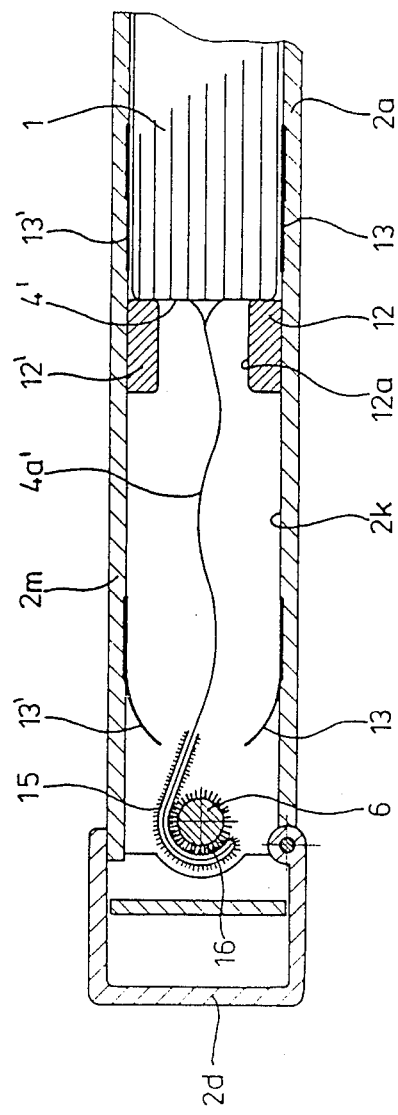

FILM SUPPLY MAGAZINE FOR FILM SHEET PACKS PROVIDED WITH LIGHT-SEALING SHEATHINGS

BACKGROUND OF THE INVENTION

The present invention relates to a supply magazine which receives a pack of film sheets in a light-tight sheathing or covering and which is insertable into a device for the removal of individual film sheets, preferably X-ray films.

The sheathing of such a pack inserted in the magazine is openable at one side whereby the supply magazine can be at least partially open from above by a cover of the closed box of the magazine. In the magazines of the foregoing type a winding device is provided at the side of the box opposite to the side at which the sheating can be opened. This winding device is operated externally of the magazine box and has a winding shaft to which a flap of the sheathing should be connected so that the flap is suspended and wound on said shaft after the magazine has been closed.

A supply magazine and/or a film sheet pack with a sheathing suitable for such a magazine have been disclosed, for example in DE-GMS No. 77 25 804. In this conventional film supply magazine the winding flap provided on the pack sheathing is guided through a slot of the winding shaft or is clamped between the winding shaft and a clamp provided on the shaft. This process is complicated. The supply magazines of this type have been also disclosed in DE-OS No. 35 43 024, DE-PS No. 34 25 423 and DE-PS No. 31 22 583. These supply magazines however cannot be loaded at day light.

SUMMARY OF THE INVENTION

It is an object of the present invention to provide an improved film supply magazine.

It is a further object of the invention to provide a magazine-film pack combination in which the connection between the winding shaft of the magazine and the flap of the pack sheathing would be simple and reliable.

These and other objects of the invention are attained by a film supply magazine for insertion into a device for the removal of individual film sheets, preferably X-ray film sheets, in which film sheets are positioned in a pack and wrapped in a sheathing openable at one side, said magazine comprising at least partially openable box, a cover for closing said box which receives a film pack in said sheathing, said box having a side opposite to an openable side of said sheathing; winding means positioned at said opposite side of said box, said sheathing having at least one winding flap, said winding means including a winding shaft for suspending and winding said winding flap together with said sheathing on said shaft after said magazine has been closed; and Velcro connecting means provided between said flap and said shaft.

Due to the provision of the Velcro type connection between the winding shaft the manufacturing of this connection is very simple. This connection also ensures the improvement of the guidance of the sheathing flap towards the winding shaft and an automatic connection of said flap to the winding shaft.

Said connection means may include a Velcro tape covering said shaft at an elongated portion thereof to which said flap is to be secured.

The connection means may also include a Velcro tape inserted in a groove formed in said shaft at an elongated portion thereof to which said flap is to be secured.

The connection means may include a Velcro tape glued to a surface of said shaft at an elongated portion thereof to which said flap is to be secured.

The connection means may include a Velcro tape provided on said shaft and a Velcro tape piece complementary to said Velcro tape and arranged on said flap.

The objects of the invention are also attained by a supply magazine for receiving film sheet packs of various types provided with respective light-tight sheathings of various widths having different winding flaps of predetermined width and in predetermined position on a respective sheathing, wherein a pack of the width corresponding to that of a magazine side or magazine cover is brought to a stop in said magazine, the magazine comprising a winding shaft for winding said winding flaps thereon when the pack is received in said magazine so as to pull said sheathing from the pack; and a Velcro tape arranged on said shaft non-symmetrically to a central plane of elongation of the magazine at an elongated portion of said shaft to which the winding flaps of sheathings of various types of packs are to be secured.

The objects of the invention may be attained by a film supply magazine for receiving therein film packs, comprising a box; stop strips arranged in said box transversely to a direction of insertion of a pack for positioning the pack in said direction along a length of the pack in a respective position, each pack having a light-tight sheathing provided with at least one winding flap; an externally operated winding shaft for winding thereon of said flap so as to pull said sheathing from said pack; guiding means for said winding flap, said guiding means being positioned between a pack-side edge of said stop strips and said shaft and being parallel to a central plane of the magazine and symmetrical to each other relative to said plane, said flap carrying at a free end thereof lugs provided at both surfaces and formed of Velcro tape, said shaft having a further Velcro tape connectable to said Velcro tape and provided in a region of said shaft to which said flap is to be secured.

The connecting means may include a first Velcro tape attached to said flap and a second Velcro tape attached to said shaft, said first Velcro tape being softer than said second Velcro tape.

The winding flap may be longer than a distance between the pack-side edges of said stop strips and said shaft.

The magazine box may have two opposing inner faces, said guiding means including stop strips and elastic tongues, said strips and tongues being positioned at said inner faces, two opposing tongues together with two opposing strips which form a funnel therebetween forming a slot for passing therethrough of said flap towards said shaft.

The stop strips and tongues may be positioned on said inner faces in pairs, respectively, said pairs of strips and said pair of tongues being interchangeable with each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is a sectional view through the magazine of FIG. 4 during the insertion of the film pack;

FIG. 6 is a sectional view of the magazine of FIG. 5 in a further stage of the film pack insertion;

FIG. 8 is a sectional view through the magazine of FIG. 7 during the insertion of the film pack; and FIG. 9 is a sectional view similar to that of FIG. 8 of the magazine during a further stage of the insertion of the film pack.

DETAILED DESCRIPTION OF THE PREFERRED EMBODIMENTS

Figure 1:
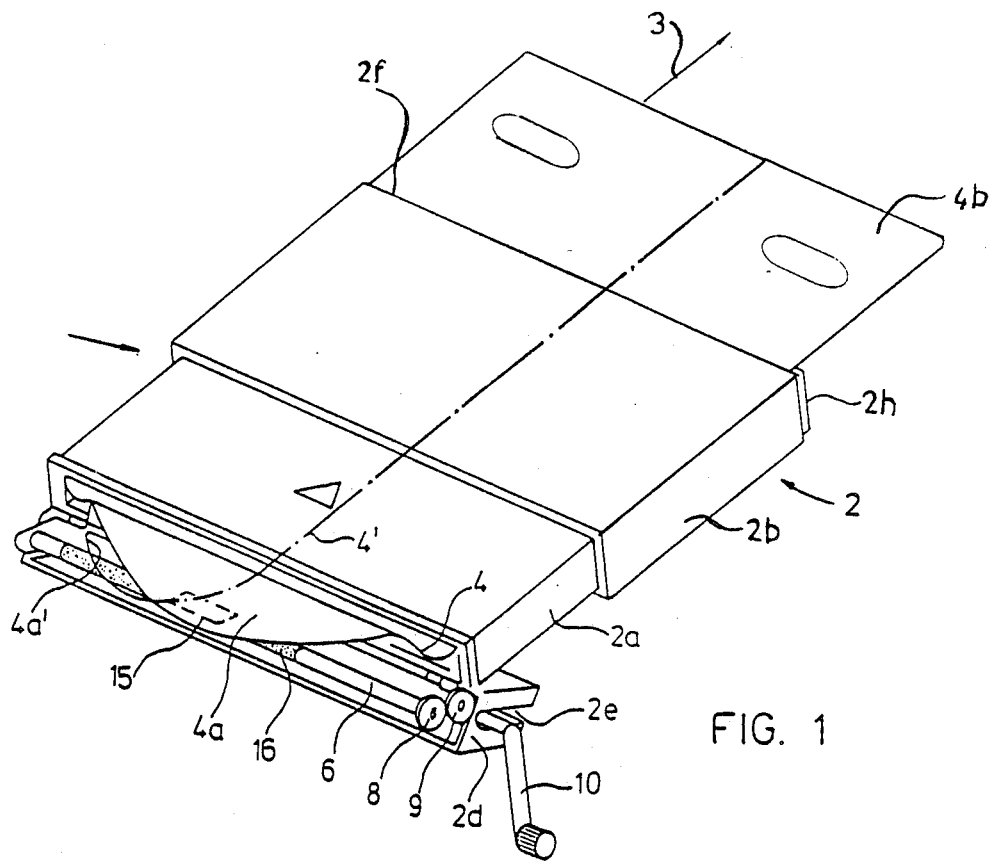
FIG. 1 is a perspective view of the supply magazine of the invention and a sheet stack usable therein.

As shown in the drawings, a supply magazine 2 comprises a partially open box 2a and a cover 2b formed as a slide tube. The insertion opening of box 2a lies in the direction of inlet of the magazine 2 in the device for loading cassettes adjacent a front side 2h of the box 2a. The insertion opening is so large that a film stack insertable into box 2a is therein positionable and also light-tight closable in the displaced position of the slide tube 2b by the latter. The rear side 2d, as viewed in the insertion direction 3, is formed as a gripping part for the insertion of the magazine 2 into the cassette device and for the removal of the magazine from said device. The rear magazine side 2d is also hingeable and in its closed position it forms a light-tight closed rear wall of the magazine. Immediately behind this rear wall, is positioned in the interior of the box 2a or rear wall 2d a winding shaft 6 which is supported in the side walls. A winding flap or tongue 4a is provided to connect a newly inserted sheathing or jacket 4 to the shaft 6. A light-sealed closed film sheet stack which is non-visible from outside is positioned in the sheathing 4.

The winding shaft 6 can directly or through gears 8, 9 be coupled with a winding crank or handle 10 which extends outwardly from box 2a with which this crank is light-tight connected. The crank 10 can have a pivotable non-shown joint so that it can be pivoted to the functional position shown in FIG. 1 or to the non-operative position in a recess 2e of the rear wall 2d. The non-operative position must be obtained when the magazine 2 is inserted into the device 1. Magazine 2 in accordance with the embodiment of FIG. 1 can be also formed so that at the front edge 2 of the slide cover 2b, as viewed in the direction of insertion 3, can be positioned above the insertion opening 2c, a separating strip. Such a strip or bar can be formed as a blade or saw and extend somewhat over the edge 2f.

For the repeated loading of the magazine 2 the insertion opening is released by opening the slide cover 2b and the winding shaft 6 is released by opening the rear wall 2d. Then the covering or sheathing 4 of the already removed film pack is pulled out from the winding shaft 7 and the non-visible reinforcement-and-holding cardboard provided below the emptied pack is removed from the box. The cardboard has an upwardly extending abutment at the rear side. The supporting cardboard together with the abutment serve to prevent displacement of the pack or individual sheets therein during the pulling of the covering from the pack in the closed magazine 2.

A new film sheet pack with the covering 4 is inserted into box 2a through the insertion opening whereby the winding flap 4a guides the pack up to the region of the winding shaft 6 and is connected to the winding shaft 6. The front-side locking flap 4b, as viewed in the insertion direction 3 of magazine 2, must, with the closed magazine 2, separate sheathing 4 and therefore this flap 4b is formed as a tearing-up flap. The tearing flap 4b with the opened magazine 2 is positioned so that, upon closing of the magazine, the flap 4b will extend between the separating strip and the upper surface of the box side 2h outwardly of the magazine. This position is shown in FIG. 1. Then handle 10 is pivoted out and the rear wall 2d is closed. Finally the tearing flap 4b is separated by means of hand and along the separating strip. It can be also possible to utilize a conventional lock and/or magazine structure for opening the covering or sheathing. Thereby the sheathing 4 is opened in the closed magazine 2 at the front side so that it can be pulled rearwardly without a significant force application. Handle 10 is now moved whereby shaft 6 is rotated. The winding flap 4a and sheathing 4 are then preferably completely wound up on the shaft 6. The newly loaded magazine is then inserted into the device 1 in a simple fashion.

Figure 2:
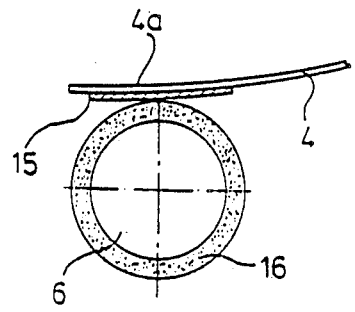
FIG. 2 is a sectional view of the part of the magazine of FIG. 1.

In order to be able to secure the winding flap 4a of the sheathing 4 of the film sheet pack to the winding shaft 6 rapidly and reliably and without any specific skill, a Velcro tape 15 (hook and loop type fastening tape) is attached to the winding flap 4a facing the winding shaft 6, as shown in FIGS. 1 and 2. In the region in which the winding flaps 4a of the sheathing 4 are to be connected to the Velcro tape 15 the winding shaft 6 is wrapped with a Velcro tape 16 (hook and loop type fastening tape). The latter is formed complementary to the Velcro tape 15 whereby with known Velcro connections the Velcro tapes can be loop-shaped or rolled or hook-shaped. It is also possible to form both complementary Velcro tapes as hook-shaped.

Figure 3:
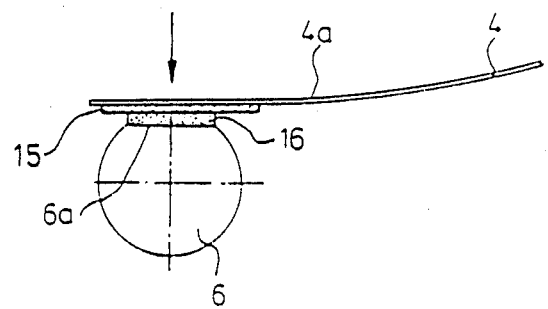
FIG. 3 is a sectional view of the part of the supply magazine of another embodiment.

According to FIG. 3, a shaft-side Velcro tape piece 16, is glued to the flattened portion 6a of the shaft periphery. It is further possible to provide an elongated groove in the periphery of the shaft 6 and to glue the Velcro tape 16 in said groove along the length thereof whereby a greater rigidity of the connection between the Velcro tape 16 and shaft 6 would be obtained. For connecting the winding flap 4a to the winding shaft 6 a Velcro tape piece 15 of the flap 4a is merely pressed against the Velcro tape 16 provided on the shaft 6. This connection is sufficiently stable to reliably wind the sheathing 4 on the shaft 6. On the other hand, upon unwinding of the empty sheathing 4 from the shaft 6, the sheathing can be quickly and problemless released from the shaft 6.

Figure 4:
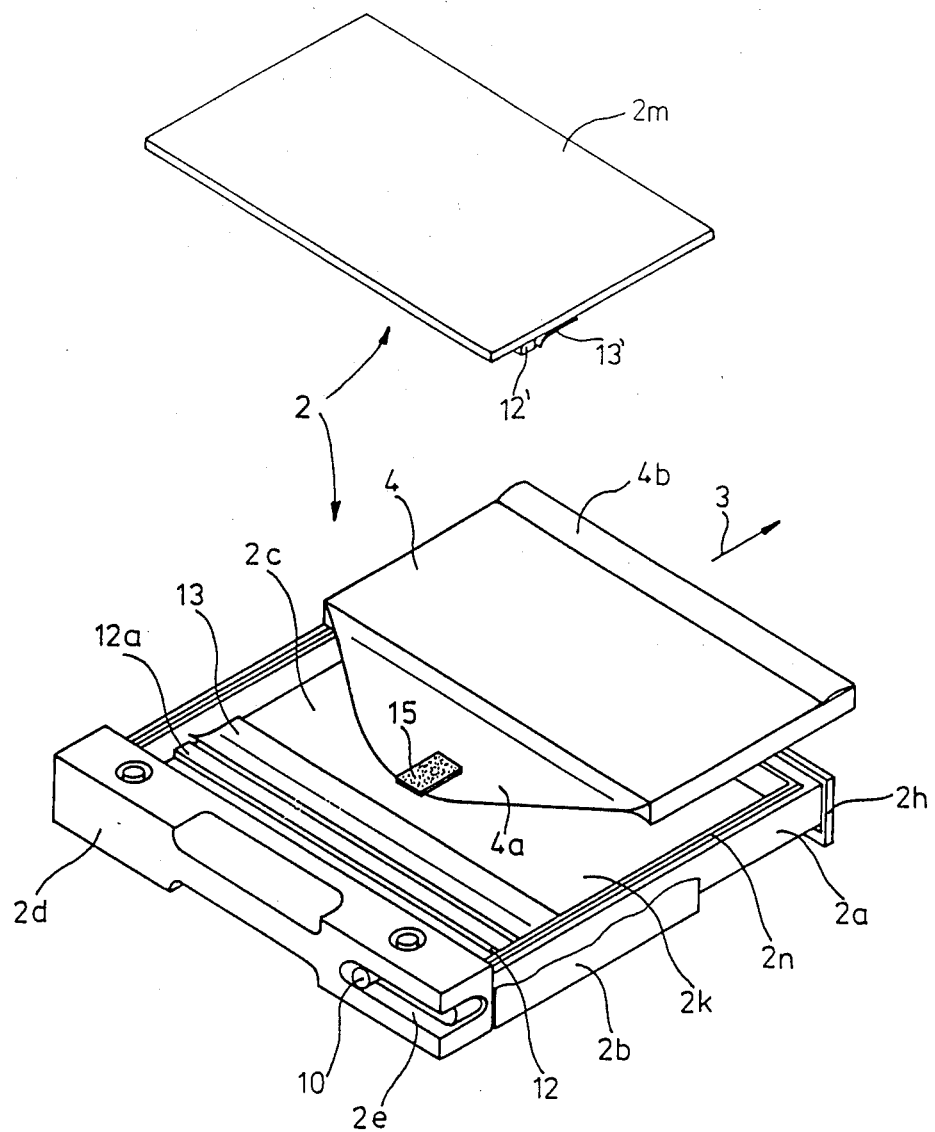
FIG. 4 is a perspective view, partially broken, of a partially pulled supply magazine for a film pack of greater format, according to a further embodiment.
Figure 7:
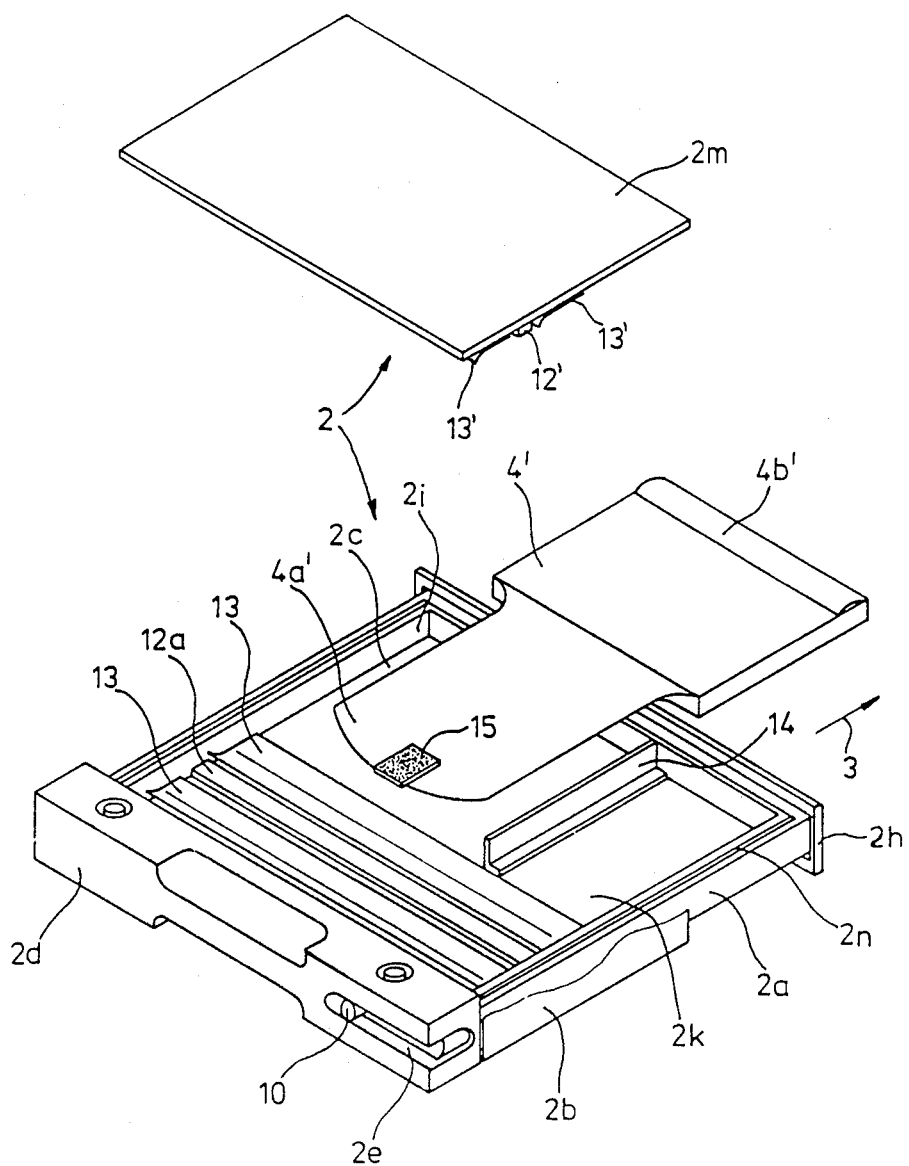
FIG. 7 is a perspective view of the supply magazine of FIG. 4 for film packs of smaller formats.

Now the supply magazine 2 of a conventional structure and of any desired size and also with a film sheet pack of any desired size can be inserted into respectively sized sheathings 4. The elongated edges of various sheathings 4, 4' are all brought in contact with the magazine elongated inner edges and at the front side with the inner face of the magazine 2 or the side corner 2i. The winding flaps 4a, 4a' are all connectable to the winding shaft 6. The Velcro tape pieces of the flaps 4a, 4a' are brought into contact with shaft 6 at various points thereof. According to FIG. 1 a second smaller sheathing 4', 4a' is shown; this sheathing is displaceably arranged in the longitudinal direction relative to the Velcro tape 16 provided on the winding shaft 6 and is non-symmetrical relative to the central elongated axis of magazine 2. With the use of the magazines for smaller film sizes a stop strip 12 for positioning such small-size film sheet packs must be arranged at a greater distance from the shaft 6 (FIG. 7) than for the magazines for greater film sizes (FIG. 4). The winding flaps 4a of the sheathing 4 for different film sizes are also respectively longer the shorter is the side of sheathing 4 which is parallel to the direction of insertion 3.

It is understandable that the embodiments different from these shown in FIGS. 1 and 2 are possible. For example, sheathings 4, 4' of the film sheet packs of different sizes can have two or more flaps, for example they can be positioned on and uniformly over the width of the sheathing 4 or 4'. In this case each winding flap of the sheath is provided with a respective Velcro tape so that the corresponding Velcro tape pieces are also provided in the same arrangement of the shaft 6.

FIGS. 4–9 show the embodiments for automatic mounting of the winding flaps 4a and automatic connecting of the same to the winding shaft 6. If sheathing 4 for smaller size-film packs is used the guidance and the mounting of the longer winding flaps 4a to the shaft 6 is rather difficult. Furthermore, with a fully closed magazine, an automatic guiding and hooking of the flap 4 to the shaft 6 must be carried out.

For this reason, an elastic tongue 13 is provided on inner flat side 2k of box 2a, having the stop strip 12. Tongue 13 may be formed before and/or behind the stop strip 12, as viewed in the insertion direction 3, and extends relative to an upper edge 12a of the stop strip 12 or the shaft 6 in a parallel, funnel or wedge-shaped manner. Since the upper wall 2m of box 2a (FIG. 4) is formed as a separate part and is glued or welded in a groove 2n provided in the box 2a and the guidance of the winding flap 4a is carried out symmetrically to the central plane of the magazine, an upper stop strip 12' and an upper tongue 13 arranged before and/or behind this strip are provided at the inner side of the upper wall 2m in a mirror-inverted manner relative to the lower stop strip 12 and lower tongue 13, respectively, whereby between the lower and upper stop strips 12 and 12', a slot for passing therethrough and guiding of the winding flap 4a towards the shaft 6 is formed. Tongues 13 and 13' are positioned against edges 12a and 12a' when no film pack is inserted in the magazine. If now, particularly a small-size film pack provided with the sheathing 4 with longer winding flaps 4a (FIGS. 5 and 6) is inserted into the box 2a counter to the direction of arrow 3, both elastic tongues 13 and 13' guide respective winding flaps 4a between stop strips 12 and 12' so that the flaps are moved to the region of the winding shaft 6. As clearly shown in FIGS. 5 and 6, when film pack 1 with the sheathing 4 reaches the tongues 13 and/or 13' the pack, due to elasticity of the tongues, deflects these tongues to the inner surfaces 2k and/or 2m of the box 2a until the pack comes into contact with the stop strips 12 and/or 12'. Then the cover 2b is closed, the front flap 4b of the sheathing 4 opens in the above described manner and the sheathing is drawn off pack 1 by means of handle 10 and shaft 6. The film pack 1 is aligned and held in its position at the corner 2i by the stop strip 12 and/or 12' during the removal of sheathing 4.

In place of the slide cover 2b a hinged cover can be provided. With the magazines for small-size film sheet packs (FIGS. 7 to 9) it is possible to provide a positioning strip 14 perpendicular to the stop strip 12 and corresponding to the width of the film pack. Positioning strip 14 can be arranged on the bottom 2k of the box 2a. Instead of using the strips 12, 12' or 14 and tongues 13,13' it is possible to provide strips and tongues formed as plates, for example of plastic material or reinforced cardboard directly on the inner flat side of the box 2a and secure these plates to the bottom of the box or to the inner face of the upper wall 2m. A releasable connection of these plates to the upper wall 2m can be obtained, for example by sliding in the grooves provided for this purpose in wall 2m. The structure with the plates carrying the stop strips and tongues has the advantage that such plates can be interchangeable and thus the magazine can be adjusted upon the need, to various film sizes. For guiding the winding flap 4a of the sheathing 4 when the magazine is closed, a guiding arrangement can be preferably symmetrical relative to the central plane of the magazine 2 and extend towards shaft 6. Any suitable conventional guiding arrangment can be utilized in this case. A guiding means must be also provided for smaller size-film packs. With the magazine for a larger film pack size only a set of tongues 13,13' and stop strips 12,12' are provided whereby the winding flaps 4a are guided at an angle relative to each other to the inclined stop strips 12,12' and directly to the shaft 6 as shown in FIGS. 5 and 6. With the magazine for packs of smaller sizes it can be necessary to provide regular tongues 13,13' before stop strips 12,12' for guiding respectively longer winding flaps to the shaft 6. Under the circumstances, a number of sets of the stop strips 12,12' and tongues 13,13' can be provided one after another whereby one tongue pair 13,13' or one strip pair 12,12' can be arranged immediately before shaft 6. In the region between the winding shaft 6 and the strips 12,12' holding the film pack 1, a plurality of pairs of strips extending angularly to each other or in the funnel-like manner or reinforced films or waved films symmetrically positioned relative to each other can be provided in the device in place of tongues 13,13'.

In order not only guide the winding flaps 4a to the shaft 6 but also to obtain an automatic connection of the flaps 4a to the winding shaft without manipulations when the rear wall 2d is closed, a lug 15, comprised of a soft material of the known Velcro lock is provided on the end face of the winding flap 4a. The winding shaft 6 is wrapped with and glued to the Velcro tape 16, and the hard part of the Velcro lock, at least at the portion of its length, at which the Velcro tape lug 15 is provided can be moved by guides 12,13, 12',13' towards the shaft.

The mode of operation of the fully automatic guidance and suspending device 12,12', 13,13', 15,16 is clear from FIGS. 5, 6 and 8,9 for film packs of different sizes. It is favorable when the winding flap 4a is sufficiently longer than the distance between the positioned film pack 1 and the winding shaft 6. According to FIG. 5, the film pack 1 of larger size is inserted into the magazine 2 in the direction opposite to arrow 3 until the pack comes into contact with stop strips 12,12'. Then cover 2b is closed. The rear wall or cover 2d can be then also closed. The tongues positioned opposite to each other, respectively, guide the waved winding flaps 4a towards the shaft 6. As shown in FIG. 6 the coil-shaped winding flap 4a is inserted between sloped surfaces 12a, 12a' so that these flaps act as a meander-shaped spring to press the Velcro tape 15 against shaft 6.

The Velcro tape lug 15 in all cases comes to contact with the Velcro tape piece 16 either radially (FIG. 6) or tangentially (FIG. 5) so that the winding flap 4a and the winding shaft 6 are automatically suspended relative to each other via the Velcro tapes 15,16. If now the winding shaft 6 is rotated by handle 10 in the corresponding direction the Velcro tape lug 15 first and then the winding flap 4a and finally the entire sheathing 4 is wound on the shaft 6. If, for example Velcro tape lug 15 is applied to shaft 6 tangentially (FIG. 5) and to the Velcro tape 16 from above the shaft is rotated in clockwise direction so that Velcro tape lug 15 will be taken along and wound on the shaft 6. The shown embodiment functions in each case and independently from the direction of rotation of handle 10 by a user.

The embodiment of FIGS. 8 and 9 is suitable for the magazine for small size film packs. The distance between the film pack and the winding shaft is respectively greater so that the guiding means 12,12', 13,13' must be more extensive as described.

When the winding flaps 4a are longer than the distance between the film pack 1 and shaft 6 and the flaps are wave-shaped a further advantage of the proposed invention resides in that many coils have been already wound on shaft 6, and a complete pulling and also tearing and removal of the sheathing are obtained when handle 10 is operated. It is further expedient that the Velcro tape 15 would extend along the sides of the flap so that in all instances the flap will be hook to the Velcro tape 16 independently on which side faces the flap.

It will be understood that each of the elements described above, or two or more together, may also find a useful application in other types of film supply magazines differing from the types described above.

While the invention has been illustrated and described as embodied in a film supply magazine for film sheet packs provided with light-sealing sheathing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A film supply magazine for receiving therein film packs, comprising a box; stop strips arranged in said box transversely to a direction of insertion of a pack for positioning the pack in said direction along a length of the pack in a respective position, each packing having a light-tight sheathing provided with at least one winding flap; an externally operated winding shaft for winding thereon of said flap so as to pull said sheathing from said pack; guiding means (12a, 12a', 13, 13') for said winding flap, said guiding means being positioned between a pack-side edge of said stop strips and said shaft and being parallel to a central plane of the magazine and symmetrical to each other relative to said plane, said flap having two opposite surfaces and carrying at a free end thereof lugs provided at said two opposite surfaces and formed of a hook and loop type fastening tape, said shaft having a further hook and loop type fastening tape secured thereon and connectable to said hook and loop type fastening tape lugs and provided in a region of said shaft to which said flap is to be secured, said box having two opposite inner faces, said guiding means comprising elastic tongues, said stop strips and tongues being positioned on said inner faces, two opposing tongues together with two opposing strips, which form a funnel therebetween, forming a slot for passing therethrough of said flap towards said shaft.

2. The supply magazine as defined in claim 1, wherein said flap is longer than a distance between the pack-side edges of said stop strips and said shaft.

3. The supply magazine as defined in claim 1, wherein said stop strips and tongues are positioned on said inner faces in pairs, respectively, said pairs of stop strips and said pairs of tongues being interchangeable with each other.

* * * * *